Figure 1:
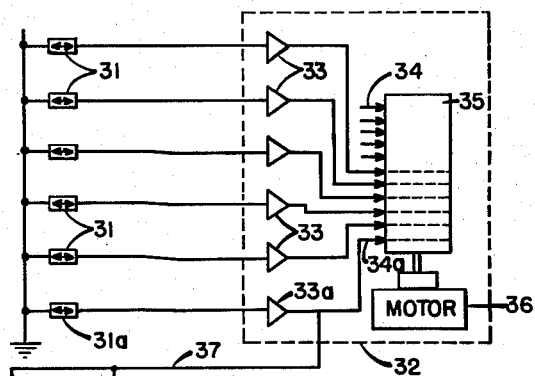

Sept. 28, 1965   C. C. LASH   3,208,546

SEISMIC SHEAR-WAVE PROSPECTING

Filed Oct. 24, 1960

*INVENTOR:*
CHARLES C. LASH

BY Newell Potter

*ATTORNEY*

3,208,546
SEISMIC SHEAR-WAVE PROSPECTING
Charles C. Lash, Tulsa, Okla., assignor to Pan American Petroleum Corporation, Tulsa, Okla., a corporation of Delaware
Filed Oct. 24, 1960, Ser. No. 64,518
5 Claims. (Cl. 181—.5)

This invention relates to seismic geophysical surveying and is directed particularly to a method and apparatus for utilizing horizontally polarized shear waves in such surveying.

In seismic geophysical surveying as it is most often practiced, use is ordinarily made only of the compressional seismic waves generated by detonating an explosive charge in a shot hole drilled to a shallow depth below the weathered layer at the earth's surface. Proposals and attempts have been made to utilize shear waves instead of compressional waves for such prospecting; but in spite of much experimentation and effort, it has not yet become practical to do so. Due to their different travel velocity and reflection coefficients, horizontally polarized shear waves (frequently called simply SH waves) offer certain advantages over compressional waves for prospecting use; but it has hitherto proved impractical to generate them in sufficient stength to overcome the noise level produced by the compressional and other types of waves generated simultaneously.

Most proposed shear-wave sources have been subject to the double disadvantage that they are mechanical devices with a limited ability to supply energy, and that the shear waves so generated are ordinarily applied at the surface of the ground and must therefore first traverse the weathered layer which is a relatively poor transmitter of shear energy. Such attempts as have been made to increase the energy level by utilizing explosives placed either on or below the ground surface or below the weathered-layer interface have so far been generally unsuccessful for the reason that the very strong compressional and other types of undesired waves generated by the explosives constitute noise which persists for such a long period of time as to substantially obscure any shear-wave reflections that might be received. Thus, although the total shear-wave energy from explosive charges below the weathering may be many times that provided by mechanical sources operating at the ground surface, the relative strength of the shear waves with respect to the interfering waves is still too small for practical purposes.

In view of the foregoing, it is a primary object of my invention to provide a novel method and apparatus for generating shear waves for use in seismic surveying wherein the effect of compressional and other interfering waves is substantially reduced or overcome. It is a further object of the invention to provide a method and apparatus for shear-wave prospecting in which substantially all types of interfering waves such as compressional and surface waves tend to cancel out, leaving the desired shear waves available for observation. A still further object is to utilize explosives in shear-wave seismic geophysical exploration in such a way as to avoid the deleterious effects of compression and other types of undesired waves on the resulting record. Other and further objects, uses, and advantages of the invention will become apparent as the description proceeds.

Stated briefly, my invention comprises detonating explosives in drilled holes extending below the weathered layer and obtaining two phonographically reproducible records, one with the horizontal shear-wave polarization produced by the charge detonation being opposite to the polarization of the other. By "phonographically reproducible" is meant any type of record adapted to scanning by a transducing element to produce a corresponding electrical wave-form similar in frequency range to the seismic waves. In all other respects, however, the records are as nearly alike as possible. Accordingly, the two records are reproduced trace by trace, corresponding trace reproductions are electrically subtracted from each other, and the resulting trace is oscillographically or otherwise visibly recorded. In this subtraction step, the oppositely polarized shear waves tend to add and reinforce each other, while the similar compressional and other interference waves on the two records substantially cancel each other. The result is a record upon which the shear-wave signal-to-noise ratio is very greatly enhanced due to the substantially complete cancellation of systematic, non-random noise. Random noise on the other hand is not similarly reinforced in the subtraction step, so that a very large net improvement in the shear-wave signal-to-noise ratio is obtained.

Figure 3:
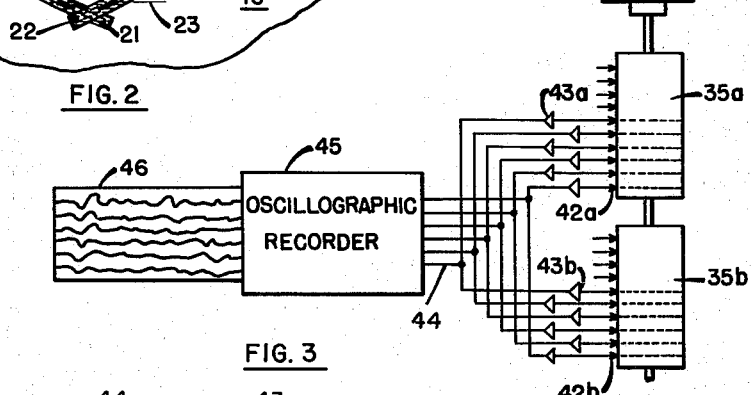
Figure 4:
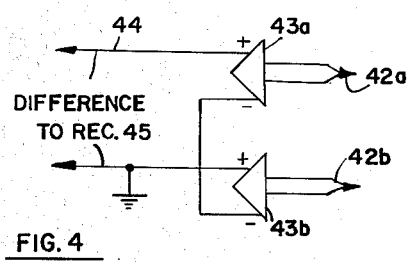

This will be understood by reference to the accompanying drawings showing a typical embodiment of the invention. In these drawings, FIGURES 1 and 2 are respectively plan and vertical cross-section views of an embodiment of the invention in field operation;

FIGURE 3 is a block diagrammatic illustration of the reproducing system employed according to the invention; and FIGURE 4 is a schematic wiring diagram showing the connections to produce subtraction.

Figure 2:
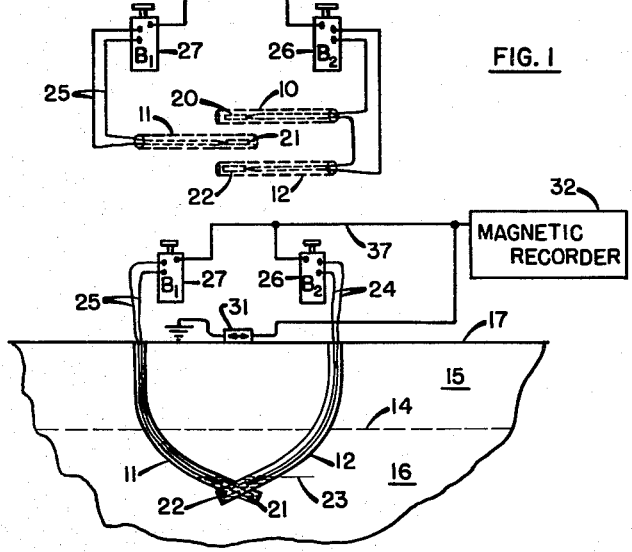

Referring now to these drawings in detail and particularly to FIGURES 1 and 2 thereof, a plurality of shot holes 10, 11, and 12 are drilled from the ground surface 17 through the lower boundary 14 of the weathered layer 15 into the subweathered layer 16. As appears in FIGURE 2, at least the bottom portion of each of the holes is slanted generally toward the others so as to reach about the same depth with about the same inclination to the vertical. The horizontal directions of deviation of the holes are preferably opposite to each other for adjacent holes and parallel to the desired direction of SH-wave polarization. In each of the holes 10, 11, and 12, respectively, is placed one of the charges of explosive 20, 21, and 22. Preferably, the charges 20 and 22, in the holes 10 and 12 which are deviated in the same direction, are about equal in total weight to the weight of the single charge 21 in hole 11 which is deviated in the opposite direction to holes 10 and 12. The electric detonators of charges 20 and 22 are preferably connected in series and by appropriate leads 24 to a blaster 26 at the ground surface 17, while the detonator of charge 21 is similarly connected by leads 25 to a blaster 27. The charges 20, 21, and 22 are preferably also covered to only a shallow depth with water or the like for tamping purposes, the tamping medium, for example, rising only to a level indicated by line 23 such that the various charges are barely submerged. This leaves a sufficient clear space above the tamping medium to let it move upwardly freely so as to avoid coupling and thereby transmitting an upward impulse to the earth of the same magnitude as in other directions.

The drilling of the slanted holes 10, 11, and 12 may be performed in any of a number of ways well known in the drilling art, one of which is shown in detail in U.S. Patent 2,336,334 to Zublin.

At the ground surface 17 aligned with their sensitivity axes horizontal, parallel to each other and to the direction of deviation of holes 10, 11, and 12, and horizontally spaced from the aligned charges 20, 21, and 22 is a spread of SH-wave receivers 31 connected to a multiple-channel magnetic recording system 32. In other words, the horizontal maximum-sensitivity axes of receivers 31 are preferably oriented perpendicular to the vertical plane which includes the line of the receiver spread and the spaced charges 20, 21, and 22. In this system, the output of each seismometer 31 is amplified by a channel amplifier 33 and applied to a corresponding magnetic recording head 34 recording on a magnetic drum 35 which is rotated at constant speed by a motor 36. By a lead 37, the time break or instant of detonation of the various charges is transmitted to the recorder 32 for recording on one of the magnetic traces.

In operation, after the seismometers 31 have been laid out along the ground surface and connected to recorder 32, and the charges 20, 21, and 22 have been positioned in their respective shot holes, one of the blasters is actuated, for example, blaster 26, to detonate simultaneously the two charges 20 and 22 which thus effectively constitute a single charge. The resultant seismic waves are recorded by the magnetic recorder 32 as a first record 35a. When this record is completed and a new record tape is in position, the blaster 27 is actuated to detonate the charge 21 and make a second record 35b.

Each charge detonation creates substantially equal and similar compressional waves, surface waves, and the like. However, the charges 20 and 22 due to the freedom of the tamping liquid at the level 23 to move to the right (and upward), transmit a greater apparent force to the left in FIGURE 2 than to the right in this figure, because the tamping liquid tends to be thrown to the right without appreciable coupling to the ground. This results in a net initial particle motion to the left, which is transmitted downwardly through the subsurface formations 16 as a shear wave with initial particle motion to the left. Conversely, the detonation of the charge 21 exerts a greater apparent force to the right than in the opposite direction, and this results in a second shear wave similar to the first in all respects except that its initial particle motion is to the right.

Compressional and other waves created by the detonation of the two charges 20 and 22 in the one instance and of the single charge 21 in the other, are substantially identical by virtue of the fact that the weight of explosive in the two detonations is about equal. The two charges 20 and 22 by detonating simultaneously create at substantial distances the same effect as a single charge located halfway betwen them, i.e., at the location of charge 21. Thus, it should be apparent that the two records 35a and 35b will be substantially identical in all respects except for the initial particle motions of any horizontally polarized shear-wave reflections, which will be exactly opposite to each other.

In some instances, it may be found that the apparent coupling of the smaller charges 20 and 22 to the earth is more efficient than for the larger single charge 21, so that they produce somewhat larger seismic-wave amplitudes than the single charge. For best cancellation, however, it is desirable to have the wave amplitudes of the two records as nearly exactly equal as possible. Accordingly, it may be found advisable to reduce the weight of the two charges somewhat, or conversely to increase the weight of the single charge. In any event, when amplitude differences appear, it will be obvious how to vary the relative charge sizes to compensate for them.

A further modification which may be used in some areas is to utilize two opposing holes and two equal charges, as by omitting hole 12 and placing equal charges in holes 10 and 11. In this case, the holes should be placed so that the spacing between the charges is as small as possible, so long as the detonation of the first charge does not set off or damage the second.

The reproducing system utilized in this invention is shown in FIGURE 3. Thus, the two records 35a and 35b are placed upon two reproducing drums connected together and driven by a single motor 41. One of the drums is movable with respect to the other and is shifted as necessary to bring into coincidence the time breaks of the two records 35a and 35b. By two arrays of reproducing heads 42a and 42b cooperating respectively with the individual traces of the records 35a and 35b and feeding channel amplifiers 43a and 43b, the two records 35a and 35b are electrically reproduced. Each trace reproduction from record 35a is then electrically combined in phase opposition with the reproduction of the corresponding trace of record 35b by connecting the outputs of amplifiers 43a and 43b in series opposition and to a recorder input lead 44, as is shown in detail by FIGURE 4, so that the difference or subtraction electrical trace is displayed by an oscillographic recorder 45 as one of the traces on a visible-trace record 46. Since in the subtraction process all events such as compressional-wave reflections, surface waves, and the like, which are the same or closely similar in amplitude and arrival time on records 35a and 35b cancel out, the resultant visible record 46 consists principally of the shear-wave reflections which reinforce by virtue of their opposite polarization on the two records. Consequently, the record 46 contains shear-wave energy with a very greatly enhanced signal-to-noise ratio as compared with either of the initial records 35a or 35b.

While the use of three slanting holes 10, 11, and 12 has been described as one means for generating the equal and oppositely polarized shear-waves in the present invention, this represents but one application of the principles of generating shear waves by means of explosives described in U.S. Patent 2,880,816. In view of the foregoing disclosure, it will be apparent how other arrays of explosives and arrangements thereof relative to reflecting and/or absorbing means as explained in said patent, can be utilized for equal and opposite shear-wave generation in accordance wtih the present invention. While equal and oppositely polarizing charges have been disclosed by said patent, they are in all cases described therein detonated in close time sequence for making a single record, rather than individually for making two equal records at different times for later combining by substraction as taught herein.

While the invention has been described with reference to the foregoing embodiments and details, it is to be understood that still further modifications and details will be apparent to those skilled in the art. The scope of the invention therefore should not be considered as limited to the particular details set forth, but it is properly to be ascertained from the appended claims.

I claim:

1. In seismic geophysical surveying, the steps which comprise, at a given location at a depth in the ground below the weathered layer, detonating a first explosive-charge array horizontally polarized in a given direction, to create seismic waves which include both undesired compressional and interference waves and desired waves which travel vertically downward from said charge as horizontally polarized shear waves, receiving the resulting seismic waves on a spread of horizontally polarized detectors aligned in said given direction and spaced apart in a direction perpendicular to said given direction, recording the outputs of said detectors as corresponding traces of a first phonographically reproducible multiple-trace record, thereafter, at substantially the same location and depth as said first detonation, detonating a second explosive-charge array with a horizontal polarization opposite to said given direction, to create seismic waves wherein said undesired compressional and interference waves are substantially identical to those produced by said first charge detonation, while said desired waves are relatively reversed in phase, receiving at said detector spread the seismic waves resulting from detonation of said second charge array, recording said resulting seismic waves as corresponding traces of a second phonographically reproducible multiple-trace record, electrically reproducing corresponding traces of both of said records in unison, substractively combining without relative time delay each two reproduced corresponding traces of said records to cause said undesired waves to substantially cancel themselves while said desired waves reinforce, and producing a visible record of said desired waves resulting from said subtractive combining step.

2. In seismic geophysical survey, the steps which comprise at different times at a given location in the earth's subsurface below the weathered layer, separately detonating each of two equal explosive-charge arrays having horizontal polarizations in respectively opposite directions, to create seismic waves which include both undesired compressional and interference waves that are substantially identical for said two detonations, and desired waves which travel downwardly from said location as horizontally polarized shear waves of respectively opposite phase for said two detonations, recording at the ground surface at points spaced along a line perpendicular to said directions, the horizontal components of motion in said directions, of the resulting seismic waves after travel through the earth's subsurface and reflection by subsurface interfaces, said recording step comprising separately making two different, phonographically reproducible records, simultaneously reproducing each two corresponding traces of said records as two corresponding electrical wave trains without relative record-time delay, combining with opposite phases said two electrical wave trains to cause said undesired waves to substantially cancel themselves while said desired waves reinforce, and recording visible resultant traces of said desired waves which are the differences between each two corresponding traces of said two records.

3. In seismic geophysical surveying, the steps which comprise, at different times at a given location beneath the weathered layer, separately detonating each of two substantially equal explosive charges each having a horizontal polarization in a different one of two substantially opposite directions, to create seismic waves which include both undesired compressional and interference waves that are substantially identical for said two charge detonations, and desired horizontally polarized shear waves with phases respectively opposite for said two charge detonations, receiving, at a point on the ground surface spaced from said location in a direction perpendicular to said opposite directions, the components of the resulting seismic-wave particle motions parallel to said opposite directions, separately recording said components as two corresponding phonographically reproducible traces, simultaneously reproducing said traces in synchronism as two corresponding electrical wave trains without relative time delay, and recording the difference between the said wave trains as a visible trace wherein said undesired waves substantially cancel themselves while said oppositephase, horizontally polarized shear waves reinforce.

4. In seismic geophysical surveying, the steps which comprise placing at a given location beneath the weathered layer two spaced, equal explosive charges, detonating a first one of said charges while relieving the explosive pressures created thereby more in one horizontal direction than in the opposite horizontal direction, to create seismic waves which include both undesired compressional and interference waves and desired waves which travel vertically downward from said charge as horizontally polarized shear waves, subsequently detonating the second one of said charges while relieving the explosive pressures in said opposite horizontal direction, to create said seismic waves wherein said undesired compressional and interference waves repeat in substantially identical form while said desired waves are of a phase respectively opposite to that for said first charge, receiving the seismic waves resulting from the detonation of each of said charges at a point on the ground surface horizontally spaced from said location in a direction perpendicular to said one and said opposite directions, separately recording as two phonographically reproducible traces the components of said resulting seismic waves parallel to said one and said opposite horizontal directions, reproducing said two traces in synchronism as two corresponding electric wave trains, subtractively combining said electric wave trains without relative time delay, and recording the electrical difference wave train resulting from said combining step as a visible trace wherein said undesired waves substantially cancel themselves while said desired horizontally polarized shear waves are substantially reinforced.

5. In seismic geophysical surveying, the steps which comprise, at a given location beneath the weathered layer, detonating a first explosive charge while coupling its explosive pressure to the earth differently in one horizontal direction than in the opposite horizontal direction, to create seismic waves which include both undesired compressional and interference waves, and desired waves which propagate vertically downward from said location as horizontally polarized shear waves, making a first reproducible record of the horizontal components, parallel to said one and said opposite directions, of the seismic waves which result from detonating said first charge and which arrive at a point spaced horizontally from said location in a direction perpendicular to said one and said opposite directions, detonating at said location a pair of second explosive charges with a combined wave-creating energy about equal to that of said first charge while coupling their explosive pressures differentially to the earth in the opposite sense to the coupling of said first charge pressure, to create seismic waves wherein said undesired compressional and interference waves are repeated in a form substantially identical to that from said first charge, while the phase of said desired horizontally polarized shear waves is reversed relative to their phase from said first charge, making a second reproducible record of the horizontal components of the seismic waves created by said second charges and arriving at said point, simultaneously reproducing said first and second records in synchronism as two corresponding electrical wave trains, subtractively combining said wave trains without relative time delay, and recording the difference between said wave trains as a visible trace wherein said undesired waves substantially cancel themselves while said desired horizontally polarized shear waves tend to reinforce.

References Cited by the Examiner

UNITED STATES PATENTS

| | | | |
|---|---|---|---|
| 2,055,476 | 9/36 | Blau | 181—0.5 |
| 2,431,600 | 11/47 | Wolf | 181—0.5 |
| 2,880,816 | 4/59 | Widess et al. | 181—0.5 |
| 2,923,367 | 2/60 | Cox | 181—0.5 |
| 3,012,625 | 12/61 | Piety | 181—0.5 |

SAMUEL FEINBERG, *Primary Examiner.*

CHARLES W. ROBINSON, KATHLEEN CLAFFY,
*Examiners.*